(12) United States Patent
Afroz et al.

(10) Patent No.: US 12,537,852 B2
(45) Date of Patent: Jan. 27, 2026

(54) SYSTEMS AND METHODS FOR DETECTING AND MITIGATING THREATS IN ELECTRONIC MESSAGES

(71) Applicant: Avast Software s.r.o., Prague (CZ)

(72) Inventors: Sadia Afroz, New York, NY (US);
Václav Belák, Havlíčkova Borová (CZ);
Kevin Roundy, El Segundo, CA (US);
Viliam Lisý, Prague (CZ); Petr Somol,
Prague (CZ)

(73) Assignee: Avast Software s.r.o., Prague (CZ)

( * ) Notice: Subject to any disclaimer, the term of this patent is extended or adjusted under 35 U.S.C. 154(b) by 180 days.

(21) Appl. No.: 18/469,117

(22) Filed: Sep. 18, 2023

(65) Prior Publication Data

US 2025/0097263 A1    Mar. 20, 2025

(51) Int. Cl.
*H04L 9/40*    (2022.01)
*H04L 9/06*    (2006.01)
*H04L 51/212*    (2022.01)
*H04L 51/216*    (2022.01)

(52) U.S. Cl.
CPC ........ *H04L 63/1483* (2013.01); *H04L 9/0643* (2013.01); *H04L 51/212* (2022.05); *H04L 51/216* (2022.05)

(58) Field of Classification Search
CPC . H04L 63/1483; H04L 51/216; H04L 51/212; H04L 9/064; H04L 9/643
USPC ........................................................ 726/22
See application file for complete search history.

(56) References Cited

U.S. PATENT DOCUMENTS

| | | | |
|---|---|---|---|
| 9,292,493 B2* | 3/2016 | Chandramouli | H04L 63/1416 |
| 9,542,668 B2* | 1/2017 | Gilad | G06Q 10/107 |
| 9,996,697 B2* | 6/2018 | Mahaffey | G06F 21/577 |
| 10,212,114 B2* | 2/2019 | Dichiu | G06F 16/93 |
| 10,277,628 B1* | 4/2019 | Jakobsson | H04L 63/1483 |
| 10,744,193 B2* | 8/2020 | Khurana | G01N 33/56983 |
| 11,134,104 B2* | 9/2021 | Qureshi | H04L 63/0471 |
| 11,546,377 B2* | 1/2023 | Boshmaf | H04L 63/0227 |
| 11,558,409 B2* | 1/2023 | Endler | H04L 63/0846 |
| 11,699,026 B2* | 7/2023 | McInerney | G06F 40/40 |
| | | | 715/254 |
| 11,973,778 B2* | 4/2024 | Giaconi | G06N 3/084 |

(Continued)

FOREIGN PATENT DOCUMENTS

EP    2811441 A1 * 12/2014    ........... H04L 51/212

*Primary Examiner* — Sargon N Nano
(74) *Attorney, Agent, or Firm* — Dovas Law, P.C.

(57) ABSTRACT

Systems and methods enable a notification based on determining a particular electronic message is associated with a particular cluster of electronic messages. A plurality of electronic messages from a first plurality of accounts directed to a second plurality of accounts over a network are received. The plurality of electronic messages are compared to determine a plurality of clusters of electronic messages. A particular electronic message is received from a first particular account directed to a second particular account. The particular electronic message is compared to the plurality of clusters of electronic messages to determine that the particular electronic message is associated with a particular cluster of the plurality of clusters of electronic messages. A notification is provided based on the determining that the particular electronic message is associated with the particular cluster of the plurality of clusters of electronic messages.

21 Claims, 5 Drawing Sheets

(56) References Cited

U.S. PATENT DOCUMENTS

| | | | | |
|---|---|---|---|---|
| 2014/0376823 A1* | 12/2014 | Cui | ................... | H04N 1/00137 |
| | | | | 382/219 |
| 2015/0180811 A1* | 6/2015 | Cornwell | .............. | H04L 51/212 |
| | | | | 709/206 |
| 2020/0396237 A1* | 12/2020 | Cohen | ................ | H04L 63/1408 |
| 2023/0082289 A1* | 3/2023 | Ji | ....................... | H04L 63/1425 |
| | | | | 726/11 |

* cited by examiner

SYSTEMS AND METHODS FOR DETECTING AND MITIGATING THREATS IN ELECTRONIC MESSAGES

FIELD OF INVENTION

The disclosure relates generally to electronic messages, and more particularly to detecting and mitigating threats in electronic messages.

BACKGROUND

Online scamming is a pervasive problem. Online scammers frequently employ social engineering, which is the process of creating an illusion of legitimacy and trust that disguises a scammer's malicious intent. A variety of tactics are used by scammers to provide a facade of legitimacy.

An advanced fee scammer for instance may craft an electronic message which appears to a recipient to be unique and specially crafted for the recipient, whereas in reality the electronic message is sent to thousands of people. Scammers routinely mimic well-established banks and government institutions by sending electronic messages from email domains that resemble official domains or from phone numbers resembling official phone numbers, whereas in reality such domains or phone numbers are new and unrelated to legitimate banks or government institutions. Further, links in scam emails may include a domain that appears to be legitimate, but actually is not. Such links are unlikely to point to a network location that a legitimate email would point to. Scammers may employ images captured from legitimate business or government sources to give the impression that their electronic communications or hosted webpages are legitimate.

A scammer may send a message to a recipient claiming to be from a particular legitimate bank and requesting the user's multi-factor authentication ("MFA") sign-in code for the particular legitimate bank. Conversely, electronic messages actually from the particular legitimate bank instruct recipients to not share their MFA sign-in code and indicate to the recipient that the bank will never request their MFA by phone call or electronic message.

Generally, scammers use tactics to make their electronic messages seem legitimate to users, but the tactics employed in a scammer's electronic messages rarely align with the methods used by the benign actors they are impersonating.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided in which a notification is provided based on determining a particular electronic message is associated with a particular cluster of electronic messages. In the method, a plurality of electronic messages from a first plurality of accounts directed to a second plurality of accounts over a network are received. The plurality of electronic messages are compared to determine a plurality of clusters of electronic messages. A particular electronic message is received via a computing system from a first particular account directed to a second particular account. The particular electronic message is compared to the plurality of clusters of electronic messages to determine that the particular electronic message is associated with a particular cluster of the plurality of clusters of electronic messages. A notification is provided via the computing system at least based on the determining that the particular electronic message is associated with the particular cluster of the plurality of clusters of electronic messages.

Another method is provided in which a notification is provided based on detecting one or both of a username or a password on a network-accessible datastore. An electronic message is received from a first account directed to a second account. One or both of a username or a password are detected in the electronic message. A network search is performed to detect the one or both of the username or the password on a network-accessible datastore, and a notification is provided via the computing system at least based on the detecting the one or both of the username or the password on the network-accessible datastore.

Yet another method is provided in which a notification is provided based on determining a particular electronic message is associated with a particular cluster of electronic messages. A plurality of electronic messages are received from a first plurality of accounts directed to a second plurality of accounts over a network. The plurality of electronic messages are compared to determine a plurality of clusters of electronic messages. A particular electronic message from a first particular account directed to a second particular account is received via a computing system. The particular electronic message is compared to the plurality of clusters of electronic messages to determine that the particular electronic message is associated with a particular cluster of the plurality of clusters of electronic messages. A number of the plurality of electronic messages that exceed a particular threshold level of similarity as compared to the particular electronic message is determined based on the comparing the particular electronic message to the plurality of clusters of electronic messages. A notification is provided via the computing system based on the determining that the particular electronic message is associated with the particular cluster of the plurality of clusters of electronic messages and based on the number of the plurality of electronic messages that exceed the particular threshold level of similarity as compared to the particular electronic message.

Also provided herein is a system including one or more processors and memory storing executable instructions that, as a result of being executed, cause the system to perform operations. The operations include receiving a plurality of electronic messages from a first plurality of accounts directed to a second plurality of accounts over a network, comparing the plurality of electronic messages to determine a plurality of clusters of electronic messages, and receiving a particular electronic message from a first particular account directed to a second particular account. The operations also include comparing the particular electronic message to the plurality of clusters of electronic messages to determine that the particular electronic message is associated with a particular cluster of the plurality of clusters of electronic messages. The operations further include providing a notification at least based on the determining that the particular electronic message is associated with the particular cluster of the plurality of clusters of electronic messages.

Further provided herein is a non-transitory computer-readable storage medium storing executable instructions that, as a result of execution by one or more processors of a computer system, cause the computer system to receive a plurality of electronic messages from a first plurality of accounts directed to a second plurality of accounts over a network and to compare the plurality of electronic messages to determine a plurality of clusters of electronic messages. The computer system is also caused to receive a particular electronic message from a first particular account directed to a second particular account and to compare the particular electronic message to the plurality of clusters of electronic messages to determine that the particular electronic message is associated with a particular cluster of the plurality of clusters of electronic messages. The computer system is further caused to provide a notification at least based on the determining that the particular electronic message is associated with the particular cluster of the plurality of clusters of electronic messages.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENTS

Systems and methods herein provide manners of discerning and alerting users to discrepancies in network communications to break the illusion of legitimacy created by online scammers. Systems described herein track statistics and patterns associated with message senders, message bodies, and metadata at a sufficiently granular level as to be able to identify inconsistencies between user expectations with respect to actions of a message sender and actual actions of the message sender. In such a manner, contradictions can be identified to puncture the illusions maintained by senders of illicit electronic messages (hereinafter "scammers") as they try to impersonate trusted entities. Described herein are systems and methods that break a scammer's veneer of legitimacy.

Described systems and methods identify statistical discrepancies. For example, investment and advance-fee scams create an illusion of a person in need reaching out to a single individual using an email. This illusion is punctured by determining that the same email was sent to tens of thousands of individuals.

Described systems and methods identify inconsistencies in the spoofing of authorities. Discrepancies are identified between scammer behavior and the motus operandi ("MO") of authoritative sites and organizations that scammers attempt to impersonate.

Described systems and methods identify artifact provenance, or in other words an artifact's origin. Illusions created by scammers are punctured by proving that the provenances of images, passwords, and other artifacts are not what the scammers claim them to be. For example, a fraudulent e-commerce website may claim to sell custom fashion items, showing images of fashion items illicitly copied from other websites. In another example, online extortion (e.g., "sextortion") attempts routinely involve a bad actor presenting passwords obtained from the dark web to a computer user to try to convince the user that the user's computer was compromised. For instance, a self-proclaimed "hacker" may transmit an electronic message to a computer user claiming to have breached the user's computer and to have obtained a single username/password combination, whereas in fact, the scammer obtained the username/password combination from a third-party breach that was posted online to a pastebin, or the scammer purchased the username/password combination on the dark web. Showing that an artifact's provenance is not what a scammer claims can puncture the illusion attempted to be created by the scammer.

As described herein, reference to "first" and "second" components (e.g., a "second plurality of accounts," a "second hash") or "particular" or "certain" components or implementations (e.g., a "particular electronic message," a "second particular account," a "particular implementation") is not used to show a serial or numerical limitation or a limitation of quality but instead is used to distinguish or identify the various components and implementations.

Figure 1:
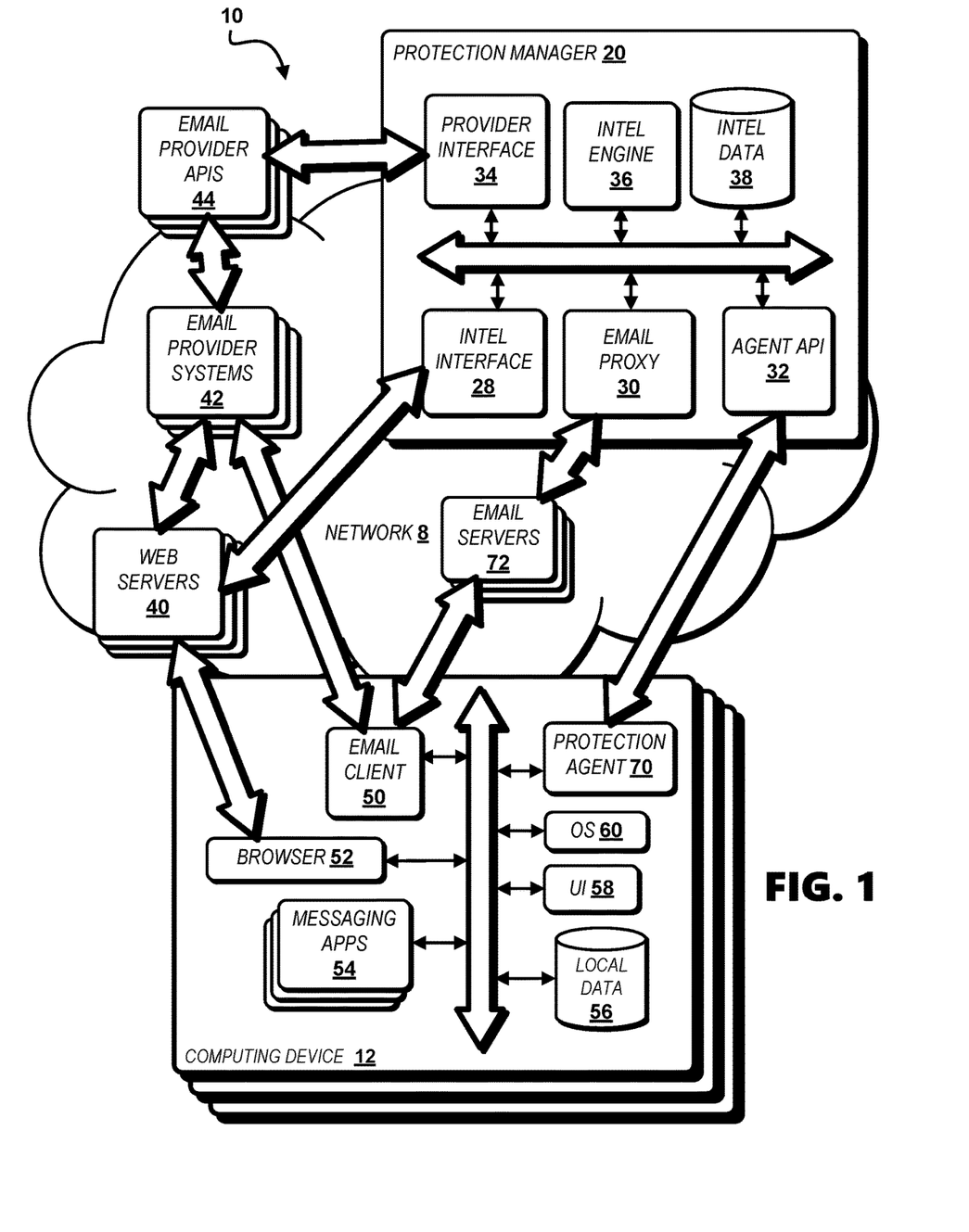
FIG. 1 shows an environment enabled by a computer network in which a network-connectable processor-enabled protection manager facilitates detecting threats to users of computing devices.

Referring to FIG. 1, an environment 10 enabled by a computer network 8 is illustrated in which a network-connectable processor-enabled protection manager 20 facilitates detecting threats to users of computing devices 12. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A protection agent 70, for example a browser extension, a browser integration, an email client extension, or an email client integration enables monitoring of communications performed by an email client 50 and network browsing activities performed on a browser application ("browser") 52 on a computing device 12. The protection agent 70 further enables aggregating of email data and browsing history and clickstreams of the user on the computing device 12 and storing of aggregated information in a local datastore 56. Monitoring by the protection agent 70 provides the protection manager 20 with intelligence data including data files and ordered sequences of hyperlinks included in emails or followed by a user at one or more websites or other network destinations. Data gathered by the protection agent 70 is transmitted by the protection agent 70, is received by the protection manager 20 via an agent application program interface ("API") 32, and is stored in de-identified form in an intelligence datastore 38.

The protection manager 20 aggregates electronic message data from a plurality of computing devices 12 via the protection agent 70 executed on the plurality of computing devices 12. The protection agent 70 monitors communications via the email client 50 and messaging applications 54. The protection agent 70 monitors via the browser 52 communications including user activity on network-based applications and websites enabled by the web servers 40 including browser-based email services (e.g., GMAIL™, YAHOO MAIL™) enabled by email provider systems 42. Monitored data is stored in the local datastore 56, is fed by the protection agent 70 to the protection manager 20 via the agent API 32, and is stored in the intelligence datastore 38, beneficially in de-identified form. The agent API 32 communicates with the protection agent 70 via the computer network 8. Alternatively, the protection manager 20 can be provided as an application on the computing device 12, for example as an integration or extension to the browser 52, and the protection agent 70 can communicate locally with the protection manager 20 via the agent API 32 on the computing device 12.

The protection agent 70 can be provided integral with or as an extension or plugin to one or more email clients 50, one or more browsers 52, or one or more messaging applications 54 and provides notices to a user via a user interface 58. The protection agent 70 monitors emails and other electronic communications from and to the email client 50 and messaging applications 54. The protection agent 70 further monitors user actions including logins, browsing history, and clickstreams from a browser 52 with which it is integrated or in communication with, which data is transmitted by the protection agent 70 to the protection manager 20 via the agent API 32, and stored in the intelligence datastore 38. The protection manager 20 provides information for identifying threats to the protection agent 70 via the agent API 32 for enabling the protection agent 70 to provide notifications to a user and to filter or remove threats confronted by an email client 50, browser 52, or messaging application 54, which information is stored in the local datastore 56. Threats can include links to webpages likely to enable scamming activity. Threats can be provided in the form of tracking URLs or URLs directed to a network locations hosting malware or computer viruses. An operating system 60 (hereinafter "OS 60") is executed on the computing device 12 which enables integration of the protection agent 70 with one or more of the browser 52, the email client 50, or a messaging application 54. The protection agent 70 is executed on a plurality of computing devices 12 of a plurality of users allowing aggregation by the protection manager 20 of de-identified data from the plurality of computing devices 12.

The protection manager 20 includes a provider interface 34 configured to connect to email provider application program interfaces ("APIs") 44, each enabled to connect to a corresponding email provider system 42. A user provides email service login credentials to the protection manager 20, for example via the protection agent 70, and the protection manager 20 through the provider interface 34 monitors emails sent by and received by the user via the email provider API 44 by applying the email service login credentials of the user.

The protection manager 20 further includes an email proxy 30 which enables a proxy email address of a user which receives email on behalf of the user, detects and filters or removes threats in received emails, forwards received emails (before or after filtering or removing the threats) to another email address in use by the user, and provides notifications (e.g., alerts) to users regarding threats in forwarded emails. The email proxy 30 can host the proxy email address and the other email address to which the received emails are forwarded. Alternatively, the user can retrieve an email from the user's proxy email address directly, before or after the email proxy 30 filters or removes one or more threats from the email. The email proxy 30 can deliver emails to a user via email servers 72 directed to the email client 50 or to a user through a web interface accessible by the user via the browser 52.

The protection manager 20, via the provider interface 34 or the email proxy 30, and the protection agent 70 and are each configured to perform processes for removing threats (e.g., URL links) from electronic messages (e.g., emails), for providing notifications regarding threats in electronic messages, and for filtering, blocking, or re-routing electronic messages including threats. Processes described herein for addressing threats in electronic messages can be performed by one or both of the protection agent 70 or the protection manager 20.

The protection manager 20, via the intelligence engine 36, and the protection agent 70 and are each configured to determine statistical discrepancies in electronic messages (e.g., emails). Based on determining one or more statistical discrepancies in an electronic message, the protection manager 20 or the protection agent 70 removes one or more threats (e.g., URL links) from the electronic message, provides a notification regarding one or more threats in the electronic message, or filters, blocks, or re-routes the electronic message.

The protection manager 20, via the intelligence engine 36, and the protection agent 70 identify messages and screenshots of messages that are clones or nearly clones of other messages using edit distance as a clustering metric and using perceptual hashes to identify similar images. Edit distance is efficiently approximated for example by locality-sensitive hashing using Jaccard similarity over n-grams. Email header information is also used for clustering, for example email header information including sender domain, timing of email transmission, and email client of the sender. One or more large language models ("LLMs") are applied to received electronic messages to distill the messages and determine message intent and to identify nearly identical messages.

The protection manager 20, via the intelligence engine 36, and the protection agent 70 also extract properties from an electronic message (e.g., an email) over which statistics are computed, the properties including message sender, sender domain, message or image content, identity of the sender (e.g., extracted from an email), and a determined intent of the message. Having identified clusters of related messages the following statistics are computed: the number of nearly identical messages sent by a particular sender, the number of messages with similar intent sent by a particular sender, the number of and a list of other senders that send the nearly identical messages, and the volume of the nearly identical messages sent by the other senders. The expected size of a message's intended audience is measured. For example, the intelligence engine 36 or the protection agent 70 determines whether an electronic message is intended as a personal or private appeal to an individual or whether the message is of a type that a recipient would expect to have been sent to a mass audience.

The protection manager 20, via the intelligence engine 36, and the protection agent 70 use computed statistics and determinations described herein to provide one or more counterfactual notifications to a user of a computing device 12 regarding an electronic message transmitted over the network 8, which one or more counterfactual notifications potentially undermine a legitimacy of one or more assertions set forth in the electronic message. In a particular implementation, a notification is provided indicating an actual audience size of an email which may contrast with an audience size perceived by a user. For example, a user may expect that an email sender is reaching out to them alone for help, when in actuality the email has been sent to thousands of recipients by the email sender.

For an electronic message that closely matches messages sent by other senders, a notification can show that there is another sender that sends similar electronic messages, but at a much higher volume, which notification provides a useful counter-fact for phishing emails, showing that the sender of a phishing email is not a legitimate sender.

A notification can show that a sender sends many emails with a particular intent (i.e., investment scams, or advance-fee scams). A notification can show that a sender impersonates many different individuals. A notification can show that a particular sender is sending emails from many different accounts.

The protection manager 20, via the provider interface 34, the email proxy 30, and the intelligence engine 36, and the protection agent 70 and are each configured to determine inconsistencies in the spoofing of legitimate entities (e.g., banks, government institutions, authoritative institutions, well-known tech companies). To identify inconsistencies in scams involving the spoofing of a legitimate entity, the protection manager 20, via the provider interface 34, the email proxy 30, and the intelligence engine 36, and the protection agent 70 record patterns of communications used by legitimate entities.

Privacy policies, security policies, and other policies that legitimate entities explicitly indicate that they abide by are extracted from web servers 40 via the intelligence interface 28. Other policies employed by legitimate entities may include the use of multi-factor authentication ("MFA"), resetting of text used in user accounts, and use of security warnings. Privacy policies, security policies, and other policies are further implied by the intelligence engine 36 based on communications and online postings or activity of a legitimate entity aggregated by the protection manager 20 via the provider interface 34, email proxy 30, and intelligence interface 28 and by the protection agent 70. For example, a communication (e.g., an online policy or distributed email) from a particular legitimate bank may explicitly warn: "DO NOT share this sign-in code. We will NEVER call you or text you for it." The intelligence engine 36 or the protection agent 70, based on the communication or other extracted or implied policies of the particular legitimate bank, is configured to render a determination that an electronic message which requests a sign-in code and asserts to be from the particular legitimate bank or from another bank is likely to be illegitimate. The protection manager 20, via the provider interface 34 or the email proxy 30, or the protection agent 70 provides a notification to the intended recipient of the electronic message including the determination that the electronic message is likely to be illegitimate. Additionally or alternatively based on the determination, the protection manager 20, via the provider interface 34 or email proxy 30, or the protection agent 70 filters or removes threats from the electronic message or filters, blocks, or re-routes the electronic message prior to access to the electronic message by the intended recipient.

The intelligence engine 36 is configured to generate hashes and embedding summaries of electronic messages collected via the email proxy 30, provider interface 34, and the protection agent 70, which hashes and embedding summaries enable exact and near-exact matches of electronic messages to record patterns of communications used by legitimate entities. The intelligence engine 36 further employs large language model ("LLM") algorithms to determine summaries of the intent of collected electronic messages to record patterns of communications.

The intelligence engine 36 determines email addresses, domains, phone numbers, and social media accounts used for official communications of legitimate entities. The intelligence engine 36 further determines HTTPS certificate chains used and typical certificate providers of legitimate entities. The intelligence engine 36 models a modus operandi ("MO") based on collected data pertaining to a legitimate entity.

Having determined electronic message properties, explicit and implicit policies, and modi operandi ("MO") of legitimate entities with respect to their communications, the intelligence engine 36 and the protection agent 70 can specifically identify elements of an electronic message that purports to be from a legitimate entity and yet is in disagreement with one or more of electronic message properties of messages sent by, explicit policies of, implicit policies of, and modus operandi ("MO") of the legitimate entity or other entities.

The protection manager 20, via the intelligence engine 36, and the protection agent 70 and are each configured to determine artifact provenance (i.e., origin). Artifacts include for example images, passwords, and identities included in an electronic message or accessible via URL links in the electronic message. The protection manager 20, via the intelligence engine 36, and the protection agent 70 and are each configured to identify or indirectly ascertain the provenance of images, passwords, identities, and other artifacts whose provenance is not what is explicitly or implicitly indicated in electronic messages directed to a user of a computing device 12, for example communications from a scammer, and provide notifications to the user regarding the provenance. The protection manager 20, via the provider interface 34 or the email proxy 30, or the protection agent 70 are configured to provide a notification identifying the provenance of one or more artifacts and identifying one or more contradictions in a particular electronic message as compared to typical messages from legitimate entities. The notification may be convincing to an electronic message recipient who may otherwise fall victim to a scam enabled by the electronic message. Additionally or alternatively, based on the determination the protection agent 70 or the protection manager 20 via the provider interface 34 or email proxy 30 filters or removes threats from the electronic message or filters, blocks, or re-routes the electronic message prior to access to the electronic message by the intended recipient.

The intelligence engine 36 and the protection agent 70 analyze electronic messages to see if they present the recipient with their own username and password combination for an account, along with a claim that the user's computing device 12 or other device or account associated with the user was hacked, which electronic messages are often transmitted as part of extortion schemes (e.g., "sextortion" schemes). The protection manager 20 and the protection agent 70 are configured to identify the true provenance of the username and password combination by crawling the dark web and other publicly accessible networks via web servers 40 for stolen passwords. In response to discovering on a publicly accessible network the username and password combination presented to the user in the electronic message, the protection manager 20 and the protection agent 70 notifies the recipient that the username and password combination was accessible on the publicly accessible network (e.g., the dark web) and that their computing device 12 or other device or account of the recipient was not likely to have been hacked by the sender of the electronic message. In such manner a true provenance of the username and password combination and a true provenance of the electronic message is ascertained. In a case where a username and password combination is not discovered at accessible network locations enabled by web servers 40 (e.g., the dark web), the protection manager 20 or the protection agent 70 provides notification to the recipient that the data was likely stolen from a third party data breach, and provides notification to the recipient regarding which username and password combination was breached so that they can change their password rather than be intimidated by a scammer's inaccurate claims.

The intelligence engine 36, via the intelligence interface 28, and the protection agent 70 analyze images received in electronic messages. The intelligence interface 28 and the protection agent 70 are configured to use online reverse image searches of the web servers 40 to identify the earliest instance of a site at which the image appeared. For example, for a fraudulent e-commerce website, linked to in an electronic message, that claims to sell custom fashion items, the protection manager 20 and the protection agent 70 can show that product images on the fraudulent e-commerce website have been copied from another network location. The protection manager 20 and the protection agent 70 can also ascertain the provenance of an image of an individual through an online reverse image search and identify mismatches between the identity claimed by a sender of a message and the real identity of the person whose image is being presented as their own by the sender of the message.

For sections of prose (e.g., sentences, paragraphs, etc.) in a received electronic message, the protection manager 20 and the protection agent 70 identify the provenance of the text, which provenance may not be expected by the recipient. The intelligence engine 36 generates hashes of subsections of electronic messages aggregated via the provider interface 34, email proxy 30, and the protection agent 70, which hashes are stored in the intelligence datastore 38. By tracking hashes of subsections of messages at a granular level, the protection manager 20 and the protection agent 70 for example identifies that text in a particular received electronic message (e.g., a poem) was not original and has been used in other electronic messages to other recipients. For example, it can be determined that a text created by a romance scammer has been used repeatedly in electronic messages sent to many individuals and is not a unique creation, and this determination can be provided in a notification to a recipient of an electronic message including the text.

Figure 2:
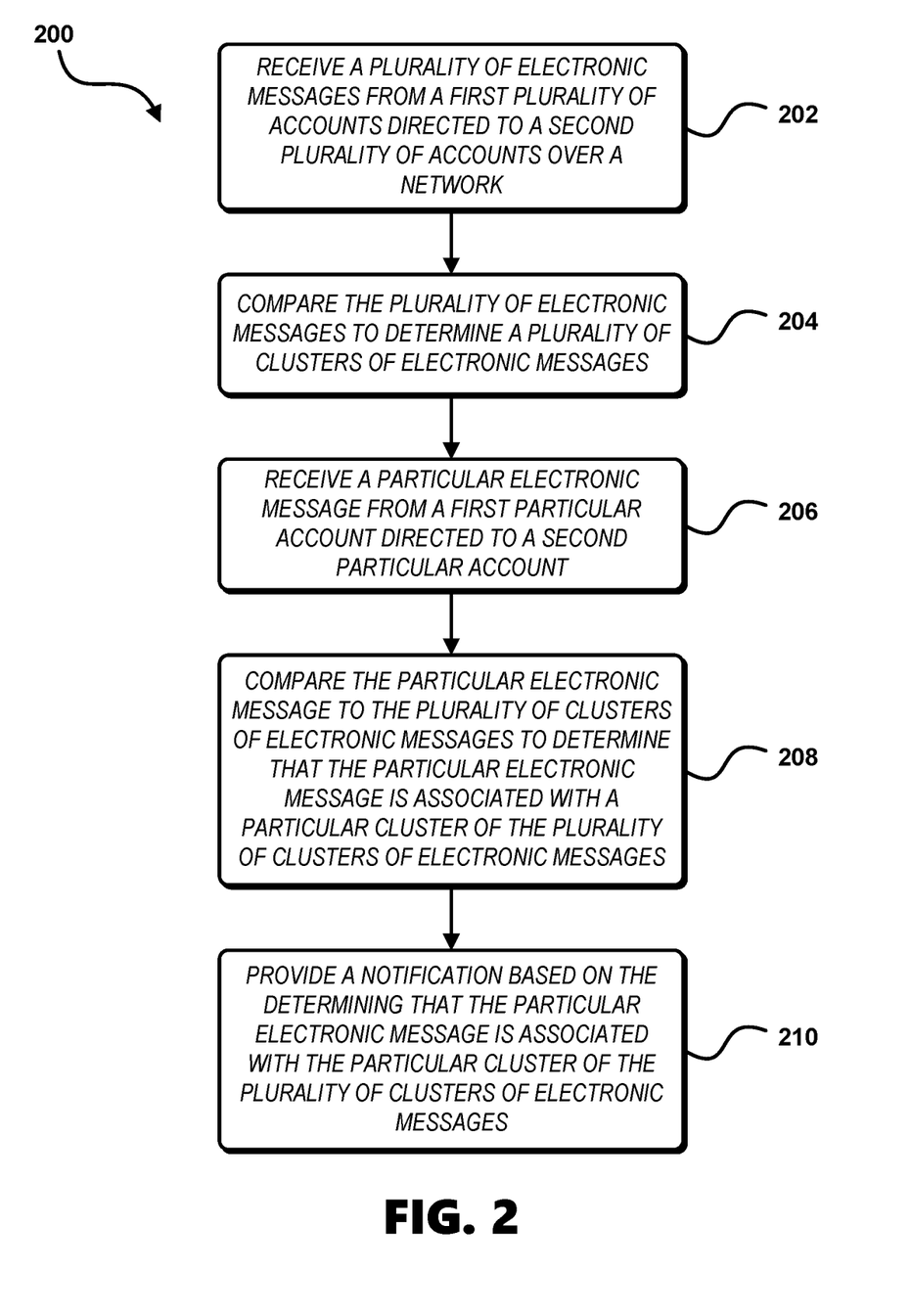
FIG. 2 is a diagram showing a method in which a notification is provided based on determining an electronic message is associated with a particular cluster of electronic messages.

Referring to FIG. 2, a method 200 is shown in which a notification is provided based on determining a particular electronic message is associated with a particular cluster of electronic messages. The method 200 is described with reference to the components of the environment 10, including the computing devices 12, protection manager 20, web servers 40, email provider systems 42, email provider APIs 44, and email servers 72. Alternatively, the method 200 can be performed via other systems and is not restricted to being implemented by the components of the environment 10.

In a step 202, a plurality of electronic messages from a first plurality of accounts directed to a second plurality of accounts are received over a network. In an illustrative embodiment, the electronic messages are received by one or more elements including one or more of the computing devices 12, protection manager 20, email proxy 30, email provider systems 42, email clients 50, messaging applications 54, protective agents 70, or email servers 72, which one or more elements enable the second plurality of accounts. The first plurality of accounts are enabled by one or more electronic message hosting systems configured to transmit messages to the second plurality of accounts. The plurality of electronic messages are compared to determine a plurality of clusters of electronic messages (step 204). The comparing of the plurality of electronic messages is performed for example by the intelligence engine 36 based on data received via one or more of the intelligence interface 28, email proxy 30, agent API 32, or provider interface 34, and the plurality of clusters are stored for example in the intelligence datastore 38. A particular electronic message is received via a computing system from a first particular account directed to a second particular account (step 206). The computing system includes for example one or more of the protection manager 20, an email server 72, a computing device 12, or an email provider system 42. The particular electronic message is compared to the plurality of clusters of electronic messages to determine that the particular electronic message is associated with a particular cluster of the plurality of clusters of electronic messages (step 208). The comparing of the particular electronic message to the plurality of clusters of electronic messages is performed for example by the intelligence engine 36, in which case the particular electronic message is received by the protection manager 20 via the intelligence interface 28, email proxy 30, agent API 32, or the provider interface 34. Alternatively, the comparing of the particular electronic message to the plurality of clusters of electronic messages is performed by the protection agent 70, in which case the particular electronic message is received by the protection agent 70 via the email client 50, a messaging application 54, or the browser 52, and the plurality of clusters of electronic messages are received by the protection agent 70 from the protection manager 20 via the agent API 32. A notification is provided via the computing system at least based on the determining that the particular electronic message is associated with the particular cluster of the plurality of clusters of electronic messages (step 210). The notification is provided for example by the protection agent 70 via the email client 50, a messaging application 54, or the browser 52 of the computing device 12. Alternatively, the notification is provided by the provider interface 34 via an email provider API 44 in communication with an email provider system 42.

The method 200 can further include one or both of blocking access to the particular electronic message or rerouting the particular electronic message at least based on the determining that the particular electronic message is associated with the particular cluster of the plurality of clusters of electronic messages. The blocking of access is performed for example by the protection agent 70 via the email client 50, a messaging application 54, or the browser 52 of the computing device 12. Alternatively, the blocking of access is performed by the provider interface 34 via an email provider API 44 in communication with an email provider system 42.

The method 200 can further include determining a number of the plurality of electronic messages that are from the first particular account and that are identical to the particular electronic message based on the comparing the particular electronic message to the plurality of clusters of electronic messages. The notification is therefore provided via the computing system further based on the number of the plurality of electronic messages that are from the first particular account and that are identical to the particular electronic message. The notification for example indicates an actual audience size of the particular electronic message which may contrast with an audience size perceived by a user of the second particular account.

The method 200 can further include determining a number of the plurality of electronic messages that exceed a particular threshold level of similarity as compared to the particular electronic message based on the comparing the particular electronic message to the plurality of clusters of electronic messages. The notification is therefore provided via the computing system further based on the number of the plurality of electronic messages that exceed the particular threshold level of similarity as compared to the particular electronic message.

The method 200 can further include determining a number of the plurality of electronic messages that are from the first particular account and that exceed a particular threshold level of similarity as compared to the particular electronic message based on the comparing the particular electronic message to the plurality of clusters of electronic messages. The notification is therefore provided via the computing system further based on the number of the plurality of electronic messages that are from the first particular account and that exceed the particular threshold level of similarity as compared to the particular electronic message.

The method 200 can further include applying a model to one or both of the particular cluster of the plurality of clusters of electronic messages or the particular electronic message to detect at least one personal appeal. The notification is therefore provided via the computing system further based on the detecting the at least one personal appeal.

The method 200 can further include detecting one or both of an image referencing an entity or text referencing the entity in one or both of the particular cluster of the plurality of clusters of electronic messages or the particular electronic message. One or more network communications associated with the entity are detected, and one or both of the particular cluster of the plurality of clusters of electronic messages or the particular electronic message are compared to the one or more network communications associated with the entity to determine an inconsistency. The notification is provided via the computing system further based on the determining the inconsistency. The one or more network communications can include a network-accessible policy. Alternatively, the one or more network communications can include one or more of the plurality of electronic messages. The entity can include, for example, a bank or a governmental institution.

One or both of a first hash or a first embedding summary can be generated based on the one or more network communications, and one or both of a second hash or a second embedding summary can be generated based on the one or both of the particular cluster of the plurality of clusters of electronic messages or the particular electronic message. The comparing the one or both of the particular cluster of the plurality of clusters of electronic messages or the particular electronic message to the at least one network communication associated with the entity to determine the inconsistency can include comparing the one or both of the first hash or the first embedding summary to the one or both of the second hash or the second embedding summary.

One or both of a first Hypertext Transfer Protocol Secure ("HTTPS") chain associated with the one or more network communications or a first certificate provider associated with the one or more network communications can be determined. One or both of a second Hypertext Transfer Protocol Secure ("HTTPS") chain associated with the one or both of the particular cluster of the plurality of clusters of electronic messages or the particular electronic message or a second certificate provider associated with the one or both of the particular cluster of the plurality of clusters of electronic messages or the particular electronic message can be determined. The one or both of the first HTTPS chain or the first certificate provider can be compared to the one or both of the second HTTPS chain or the second certificate provider. The inconsistency can be determined at least based on the comparing the one or both of the first HTTPS chain or the first certificate provider to the one or both of the second HTTPS chain or the second certificate provider.

The method 200 can further include detecting one or both of a username or a password in the particular electronic message, performing a network search to detect the one or both of the username or the password on a network-accessible datastore, and providing the notification via the computing system further based on the detecting the one or both of the username or the password on the network-accessible datastore. The network search is performed for example by the intelligence interface 28 or the protection agent 70 in contact with web servers 40.

The method 200 can further include collecting one or both of a first username or a first password from a user of the second particular account, detecting one or both of a second username or a second password in the particular electronic message, and comparing the one or both of the first username or the first password from the user of the second particular account to the one or both of the second username or the second password in the particular electronic message to determine a match. A network search is performed to detect the one or both of the second username or the second password on a network-accessible datastore, and the notification is provided via the computing system further based on the detecting the one or both of the second username or the second password on the network-accessible datastore and the determining the match. The network search is performed for example by the intelligence interface 28 or the protection agent 70 in contact with web servers 40.

The method 200 can further include detecting an image in the particular electronic message, performing a network search to detect the image on a network-accessible datastore, and providing the notification via the computing system further based on the detecting the image on the network-accessible datastore. The method 200 can alternatively include detecting in the particular electronic message a link to a first network location comprising an image, performing a network search to detect the image on a second network location, determining an origination time of the image on the first network location, and determining an origination time of the image on the second network location. The network search is performed for example by the intelligence interface 28 or the protection agent 70 in contact with web servers 40. The origination time of the image on the first network location is compared to the origination time of the image on the second network location, and the notification is provided via the computing system further based on the comparing the origination time of the image on the first network location and the origination time of the image on the second network location.

The method 200 can further include generating one or more hashes of the particular electronic message and generating a plurality of hashes of the plurality of electronic messages. The one or more hashes of the particular electronic message are compared to the plurality of hashes of the plurality of electronic messages to determine a plurality of matches and the notification is provided further based on the determining the plurality of matches.

Figure 3:
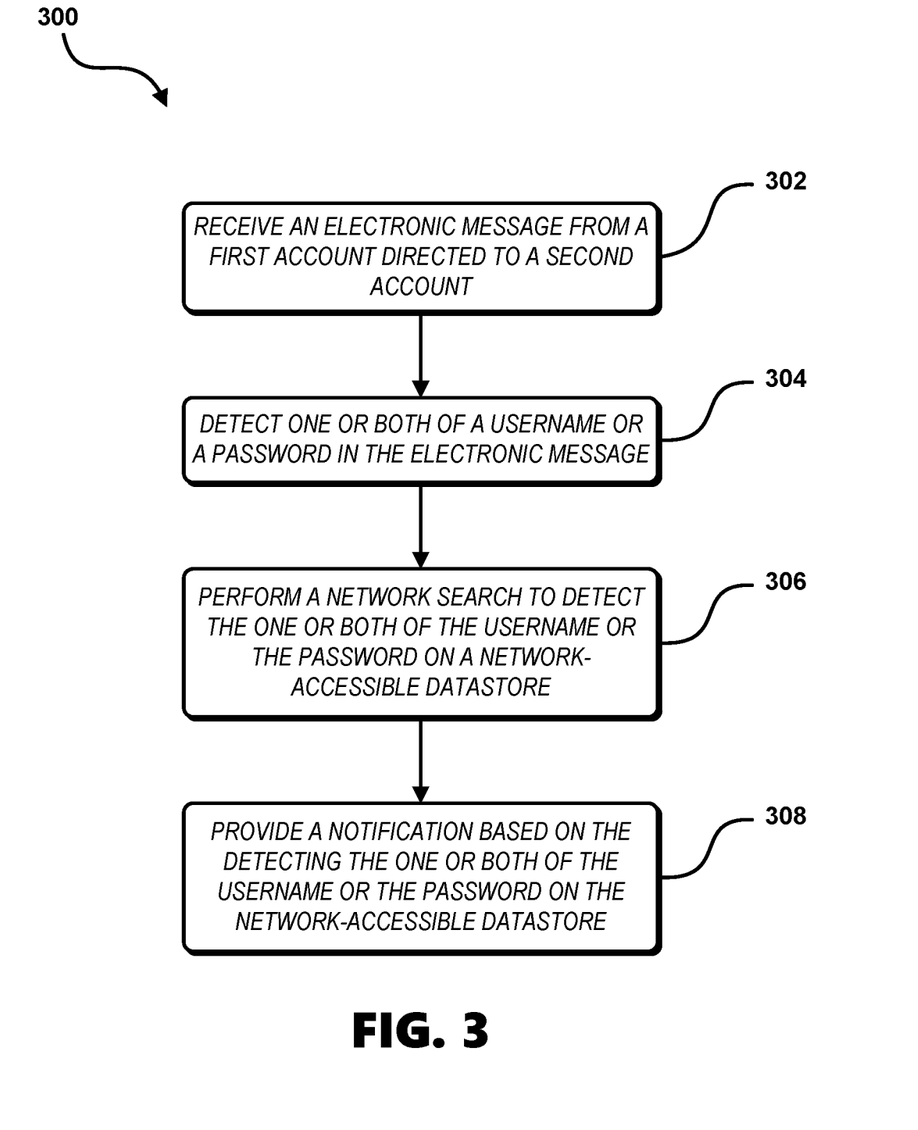
FIG. 3 is a diagram showing a method in which a notification is provided based on detecting one or both of a username or a password on a network-accessible datastore.

Referring to FIG. 3, a method 300 is shown in which a notification is provided based on detecting one or both of a username or a password on a network-accessible datastore. The method 300 is described with reference to the components of the environment 10, including the computing devices 12, protection manager 20, web servers 40, email provider systems 42, email provider APIs 44, and email servers 72. Alternatively, the method 300 can be performed via other systems and is not restricted to being implemented by the components of the environment 10.

In a step 302, an electronic message is received via a computing system from a first account directed to a second account. The computing system includes for example one or more of the protection manager 20, an email server 72, a computing device 12, or an email provider system 42. One or both of a username or a password are detected in the electronic message (step 304). A network search is performed to detect the one or more of the username or the password on a network-accessible datastore (step 306). The network search is performed for example by the intelligence interface 28 or the protection agent 70 in contact with web servers 40. A notification is provided via the computing system at least based on the detecting the one or more of the username or the password on the network-accessible datastore (step 308). The notification is provided for example by the protection agent 70 via the email client 50, a messaging application 54, or the browser 52 of the computing device 12. Alternatively, the notification is provided by the provider interface 34 via an email provider API 44 in communication with an email provider system 42.

Figure 4:
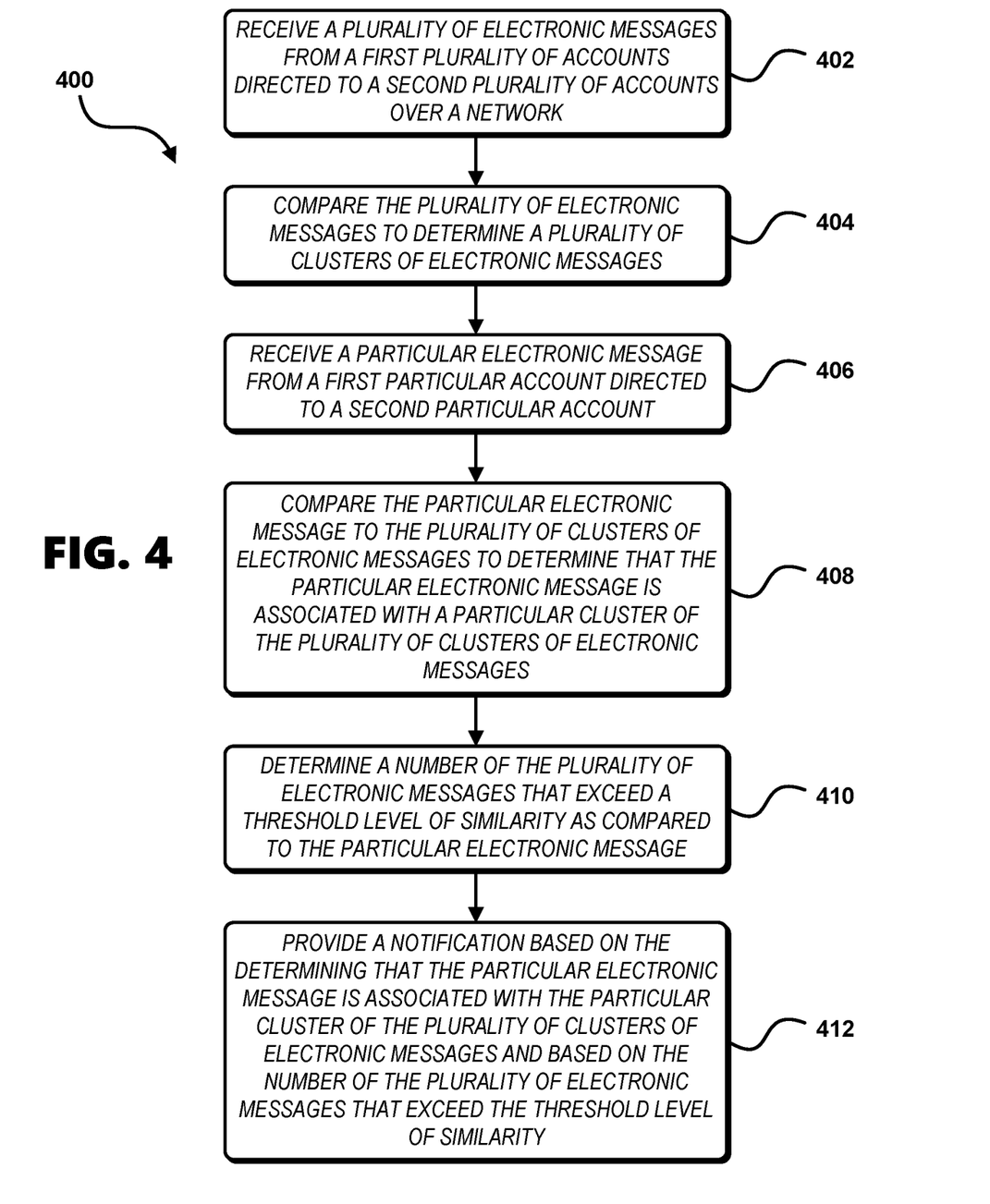
FIG. 4 is a diagram showing a further method in which a notification is provided based on determining an electronic message is associated with a particular cluster of electronic messages.

Referring to FIG. 4, a method 400 is shown in which a notification is provided based on determining a particular electronic message is associated with a particular cluster of electronic messages. The method 400 is described with reference to the components of the environment 10, including the computing devices 12, protection manager 20, web servers 40, email provider systems 42, email provider APIs 44, and email servers 72. Alternatively, the method 400 can be performed via other systems and is not restricted to being implemented by the components of the environment 10.

The method 400 includes receiving a plurality of electronic messages from a first plurality of accounts directed to a second plurality of accounts over a network (step 402). In an illustrative embodiment, the electronic messages are received by one or more elements including one or more of the computing devices 12, protection manager 20, email proxy 30, email provider systems 42, email clients 50, messaging applications 54, protective agents 70, or email servers 72, which one or more elements enable the second plurality of accounts. The first plurality of accounts are enabled by one or more electronic message hosting systems configured to transmit messages to the second plurality of accounts. The plurality of electronic messages are compared to determine a plurality of clusters of electronic messages (step 404). The comparing of the plurality of electronic messages is performed for example by the intelligence engine 36 based on data received via one or more of the intelligence interface 28, email proxy 30, agent API 32, or provider interface 34, and the plurality of clusters are stored for example in the intelligence datastore 38. A particular electronic message from a first particular account directed to a second particular account is received via a computing system (step 406). The computing system includes for example one or more of the protection manager 20, an email server 72, a computing device 12, or an email provider system 42. The particular electronic message is compared to the plurality of clusters of electronic messages to determine that the particular electronic message is associated with a particular cluster of the plurality of clusters of electronic messages (step 408). The comparing of the particular electronic message to the plurality of clusters of electronic messages is performed for example by the intelligence engine 36, in which case the particular electronic message is received by the protection manager 20 via the intelligence interface 28, email proxy 30, agent API 32, or the provider interface 34. Alternatively, the comparing of the particular electronic message to the plurality of clusters of electronic messages is performed by the protection agent 70, in which case the particular electronic message is received by the protection agent 70 via the email client 50, a messaging application 54, or the browser 52, and the plurality of clusters of electronic messages are received by the protection agent 70 from the protection manager 20 via the agent API 32. A number of the plurality of electronic messages that exceed a particular threshold level of similarity as compared to the particular electronic message is determined based on the comparing the particular electronic message to the plurality of clusters of electronic messages (step 410). A notification is provided via the computing system based on the determining that the particular electronic message is associated with the particular cluster of the plurality of clusters of electronic messages and based on the number of the plurality of electronic messages that exceed the particular threshold level of similarity as compared to the particular electronic message (step 412). The notification is provided for example by the protection agent 70 via the email client 50, a messaging application 54, or the browser 52 of the computing device 12. Alternatively, the notification is provided by the provider interface 34 via an email provider API 44 in communication with an email provider system 42.

Figure 5:
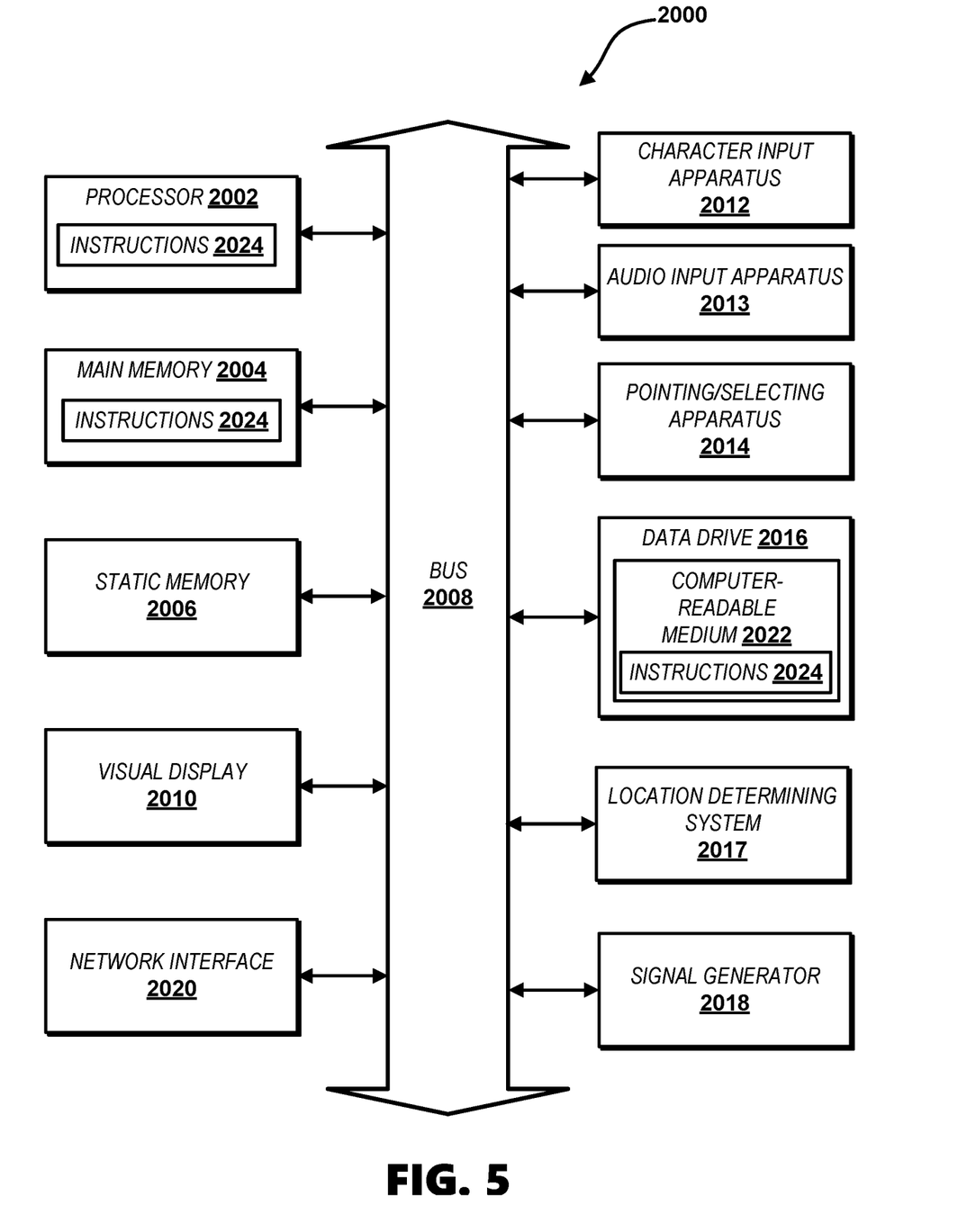
FIG. 5 shows a computer system for performing described methods according to illustrative embodiments.

FIG. 5 illustrates in abstract the function of an exemplary computer system 2000 on which the systems, methods and processes described herein can execute. For example, the computing devices 12, protection manager 20, web servers 40, email provider systems 42, email provider APIs 44, and email servers 72 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), a light emitting diode (LED) display, or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer-implemented method for mitigating electronic threats comprising:
   receiving a plurality of electronic messages from a first plurality of accounts directed to a second plurality of accounts over a network;
   comparing the plurality of electronic messages to determine a plurality of clusters of electronic messages;
   receiving via a computing system a particular electronic message from a first particular account directed to a second particular account;
   comparing the particular electronic message to the plurality of clusters of electronic messages to determine that the particular electronic message is associated with a particular cluster of the plurality of clusters of electronic messages;
   detecting at least one of an image referencing an entity or text referencing the entity in at least one of the particular cluster of the plurality of clusters of electronic messages or the particular electronic message;
   detecting at least one network communication associated with the entity;
   generating at least one of a first hash or a first embedding summary based on the at least one network communication associated with the entity;
   generating at least one of a second hash or a second embedding summary based on the at least one of the particular cluster of the plurality of clusters of electronic messages or the particular electronic message;
   comparing at least one of the particular cluster of the plurality of clusters of electronic messages or the particular electronic message to the at least one network communication associated with the entity to determine an inconsistency, the comparing the at least one of the particular cluster of the plurality of clusters of electronic messages or the particular electronic message to the at least one network communication associated with the entity to determine the inconsistency comprises comparing the at least one of the first hash or the first embedding summary to the at least one of the second hash or the second embedding summary; and providing a notification via the computing system at least based on the determining that the particular electronic message is associated with the particular cluster of the plurality of clusters of electronic messages and based on the determining the inconsistency.

2. The method of claim 1, further comprising at least one of blocking access to the particular electronic message or rerouting the particular electronic message at least based on the determining that the particular electronic message is associated with the particular cluster of the plurality of clusters of electronic messages.

3. The method of claim 1, further comprising
determining a number of the plurality of electronic messages that are from the first particular account and that are identical to the particular electronic message based on the comparing the particular electronic message to the plurality of clusters of electronic messages; and
providing the notification via the computing system further based on the number of the plurality of electronic messages that are from the first particular account and that are identical to the particular electronic message.

4. The method of claim 1, further comprising:
determining a number of the plurality of electronic messages that exceed a particular threshold level of similarity as compared to the particular electronic message based on the comparing the particular electronic message to the plurality of clusters of electronic messages; and
providing the notification via the computing system further based on the number of the plurality of electronic messages that exceed the particular threshold level of similarity as compared to the particular electronic message.

5. The method of claim 1, further comprising:
determining a number of the plurality of electronic messages that are from the first particular account and that exceed a particular threshold level of similarity as compared to the particular electronic message based on the comparing the particular electronic message to the plurality of clusters of electronic messages; and
providing the notification via the computing system further based on the number of the plurality of electronic messages that are from the first particular account and that exceed the particular threshold level of similarity as compared to the particular electronic message.

6. The method of claim 1, further comprising:
applying a model to at least one of the particular cluster of the plurality of clusters of electronic messages or the particular electronic message to detect at least one personal appeal; and
providing the notification via the computing system further based on the detecting the at least one personal appeal.

7. The method of claim 1, wherein the at least one network communication associated with the entity comprises a network-accessible policy.

8. The method of claim 1, wherein the at least one network communication associated with the entity comprises one or more of the plurality of electronic messages.

9. The method of claim 1, further comprising:
determining at least one of a first Hypertext Transfer Protocol Secure ("HTTPS") chain associated with the at least one network communication associated with the entity or a first certificate provider associated with the at least one network communication associated with the entity;
determining at least one of a second Hypertext Transfer Protocol Secure ("HTTPS") chain associated with the at least one of the particular cluster of the plurality of clusters of electronic messages or the particular electronic message or a second certificate provider associated with the at least one of the particular cluster of the plurality of clusters of electronic messages or the particular electronic message;
comparing the at least one of the first HTTPS chain or the first certificate provider to the at least one of the second HTTPS chain or the second certificate provider; and
determining the inconsistency at least based on the comparing the at least one of the first HTTPS chain or the first certificate provider to the at least one of the second HTTPS chain or the second certificate provider.

10. The method of claim 1 further comprising:
detecting a username and a password in the particular electronic message;
performing a network search to detect the username and the password on a network-accessible datastore; and
providing the notification via the computing system further based on the detecting the username and the password on the network-accessible datastore.

11. The method of claim 1 further comprising:
detecting at least one of a username or a password in the particular electronic message;
performing a network search to detect the at least one of the username or the password on a network-accessible datastore; and
providing the notification via the computing system further based on the detecting the at least one of the username or the password on the network-accessible datastore.

12. The method of claim 1, further comprising:
collecting at least one of a first username or a first password from a user of the second particular account;
detecting at least one of a second username or a second password in the particular electronic message;
comparing the at least one of the first username or the first password from the user of the second particular account to the at least one of the second username or the second password in the particular electronic message to determine a match;
performing a network search to detect the at least one of the second username or the second password on a network-accessible datastore; and
providing the notification via the computing system further based on the detecting the at least one of the second username or the second password on the network-accessible datastore and the determining the match.

13. The method of claim 1, further comprising:
detecting the image in the particular electronic message;
performing a network search to detect the image on a network-accessible datastore; and
providing the notification via the computing system further based on the detecting the image on the network-accessible datastore.

14. The method of claim 1, further comprising:
detecting in the particular electronic message a link to a first network location comprising the image;
performing a network search to detect the image on a second network location;
determining an origination time of the image on the first network location;
determining an origination time of the image on the second network location;

comparing the origination time of the image on the first network location to the origination time of the image on the second network location; and providing the notification via the computing system further based on the comparing the origination time of the image on the first network location to the origination time of the image on the second network location.

15. The method of claim 1, further comprising:

generating at least one hash of the particular electronic message;

generating a plurality of hashes of the plurality of electronic messages;

comparing the at least one hash of the particular electronic message to the plurality of hashes of the plurality of electronic messages to determine a plurality of matches; and providing the notification further based on the determining the plurality of matches.

16. A computer-implemented method for mitigating electronic threats comprising:

receiving a plurality of electronic messages transmitted to a plurality of computing systems;

receiving via a particular computing system a particular electronic message from a first account directed to a second account;

generating at least one perceptual hash of the particular electronic message;

generating a plurality of perceptual hashes of the plurality of electronic messages;

determining a similarity of the particular electronic message to the plurality of electronic messages based on the at least one perceptual hash of the particular electronic message and the plurality of perceptual hashes of the plurality of electronic messages;

detecting at least one of a username or a password in the particular electronic message;

performing a network search to detect the at least one of the username or the password on a network-accessible datastore; and providing a notification via the particular computing system at least based on the similarity of the particular electronic message to the plurality of electronic messages and the detecting the at least one of the username or the password on the network-accessible datastore.

17. A computer-implemented method for mitigating electronic threats comprising:

receiving a plurality of electronic messages from a first plurality of accounts directed to a second plurality of accounts over a network;

comparing the plurality of electronic messages to determine a plurality of clusters of electronic messages;

receiving via a computing system a particular electronic message from a first particular account directed to a second particular account;

generating at least one hash of the particular electronic message;

generating a plurality of hashes of the plurality of electronic messages;

comparing the particular electronic message to the plurality of clusters of electronic messages to determine that the particular electronic message is associated with a particular cluster of the plurality of clusters of electronic messages, the comparing the particular electronic message to the plurality of clusters of electronic messages comprising comparing the at least one hash of the particular electronic message to the plurality of hashes of the plurality of electronic messages;

determining a number of the plurality of electronic messages that are from the first particular account and that exceed a particular threshold level of similarity as compared to the particular electronic message based on the comparing the particular electronic message to the plurality of clusters of electronic messages; and providing a notification via the computing system based on the determining that the particular electronic message is associated with the particular cluster of the plurality of clusters of electronic messages and based on the number of the plurality of electronic messages that are from the first particular account and that exceed the particular threshold level of similarity as compared to the particular electronic message.

18. A system for mitigating electronic threats, comprising:

one or more processors; and memory storing executable instructions that, as a result of being executed, cause the system to perform operations comprising:

receiving a plurality of electronic messages from a first plurality of accounts directed to a second plurality of accounts over a network;

comparing the plurality of electronic messages to determine a plurality of clusters of electronic messages;

receiving a particular electronic message from a first particular account directed to a second particular account;

comparing the particular electronic message to the plurality of clusters of electronic messages to determine that the particular electronic message is associated with a particular cluster of the plurality of clusters of electronic messages;

detecting at least one of an image referencing an entity or text referencing the entity in at least one of the particular cluster of the plurality of clusters of electronic messages or the particular electronic message;

detecting at least one network communication associated with the entity;

generating at least one of a first hash or a first embedding summary based on the at least one network communication associated with the entity;

generating at least one of a second hash or a second embedding summary based on the at least one of the particular cluster of the plurality of clusters of electronic messages or the particular electronic message;

comparing at least one of the particular cluster of the plurality of clusters of electronic messages or the particular electronic message to the at least one network communication associated with the entity to determine an inconsistency, the comparing the at least one of the particular cluster of the plurality of clusters of electronic messages or the particular electronic message to the at least one network communication associated with the entity to determine the inconsistency comprises comparing the at least one of the first hash or the first embedding summary to the at least one of the second hash or the second embedding summary; and providing a notification at least based on the determining that the particular electronic message is associated with the particular cluster of the plurality of clusters of electronic messages and based on the determining the inconsistency.

19. The system of claim 18, the executable instructions, as a result of being executed, further causing the system to perform operations comprising:

determining a number of the plurality of electronic messages that are from the first particular account and that exceed a particular threshold level of similarity as compared to the particular electronic message based on the comparing the particular electronic message to the plurality of clusters of electronic messages; and providing the notification further based on the number of the plurality of electronic messages that are from the first particular account and that exceed the particular threshold level of similarity as compared to the particular electronic message.

20. The system of claim 18, the executable instructions, as a result of being executed, further causing the system to perform operations comprising:

determining at least one of a first Hypertext Transfer Protocol Secure ("HTTPS") chain associated with the at least one network communication associated with the entity or a first certificate provider associated with the at least one network communication associated with the entity;

determining at least one of a second Hypertext Transfer Protocol Secure ("HTTPS") chain associated with the at least one of the particular cluster of the plurality of clusters of electronic messages or the particular electronic message or a second certificate provider associated with the at least one of the particular cluster of the plurality of clusters of electronic messages or the particular electronic message;

comparing the at least one of the first HTTPS chain or the first certificate provider to the at least one of the second HTTPS chain or the second certificate provider; and determining the inconsistency at least based on the comparing the at least one of the first HTTPS chain or the first certificate provider to the at least one of the second HTTPS chain or the second certificate provider.

21. A non-transitory computer-readable storage medium storing executable instructions that, as a result of execution by one or more processors of a computer system, cause the computer system to:

receive a plurality of electronic messages from a first plurality of accounts directed to a second plurality of accounts over a network;

compare the plurality of electronic messages to determine a plurality of clusters of electronic messages;

receive a particular electronic message from a first particular account directed to a second particular account;

compare the particular electronic message to the plurality of clusters of electronic messages to determine that the particular electronic message is associated with a particular cluster of the plurality of clusters of electronic messages;

detect at least one of an image referencing an entity or text referencing the entity in at least one of the particular cluster of the plurality of clusters of electronic messages or the particular electronic message;

detect at least one network communication associated with the entity;

generate at least one of a first hash or a first embedding summary based on the at least one network communication associated with the entity;

generate at least one of a second hash or a second embedding summary based on the at least one of the particular cluster of the plurality of clusters of electronic messages or the particular electronic message;

compare at least one of the particular cluster of the plurality of clusters of electronic messages or the particular electronic message to the at least one network communication associated with the entity to determine an inconsistency, the comparing the at least one of the particular cluster of the plurality of clusters of electronic messages or the particular electronic message to the at least one network communication associated with the entity to determine the inconsistency comprises comparing the at least one of the first hash or the first embedding summary to the at least one of the second hash or the second embedding summary; and provide a notification at least based on the determining that the particular electronic message is associated with the particular cluster of the plurality of clusters of electronic messages and based on the determining the inconsistency.

* * * * *